(12) United States Patent
Hara (10) Patent No.: US 8,622,161 B2
(45) Date of Patent: Jan. 7, 2014

(54) INSTALLATION STRUCTURE FOR ELECTRICAL EQUIPMENT IN REAR VEHICLE BODY

(75) Inventor: Nobuhiko Hara, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 13/641,972

(22) PCT Filed: Apr. 11, 2011

(86) PCT No.: PCT/JP2011/058969
§ 371 (c)(1),
(2), (4) Date: Oct. 18, 2012

(87) PCT Pub. No.: WO2011/145409
PCT Pub. Date: Nov. 24, 2011

(65) Prior Publication Data
US 2013/0037334 A1   Feb. 14, 2013

(30) Foreign Application Priority Data

May 19, 2010   (JP) ................................. 2010-115263

(51) Int. Cl.
*B60K 1/04* (2006.01)
(52) U.S. Cl.
USPC .................................. 180/65.31; 296/193.07
(58) Field of Classification Search
USPC ............... 180/65.1, 68.5, 89.11, 69.1, 65.22,
180/65.31; 296/187.03, 187.05, 187.08,
296/187.11, 193.07, 193.08, 203.04;
361/690; 320/109; 429/100, 163
See application file for complete search history.

(56) References Cited

U.S. PATENT DOCUMENTS 6,188,574 B1 * 2/2001 Anazawa ....................... 361/695
6,854,543 B2 * 2/2005 Rowley et al. ............... 180/68.5
(Continued)

FOREIGN PATENT DOCUMENTS

JP   62-185181 U   11/1987
JP   05-193374 A   8/1993
(Continued)

OTHER PUBLICATIONS

International Search Report for Application No. PCT/JP2011/058969 dated Jul. 5, 2011.

*Primary Examiner* — John R Olszewski
*Assistant Examiner* — Brodie Follman
(74) *Attorney, Agent, or Firm* — Alston & Bird LLP (57) ABSTRACT

An installation structure includes a member 7 extending in a longitudinal direction of a vehicle and provided on the lower face of a bottom 6a of a spare tire housing 6, a charger 1 provided with fins 2 under the charger 1, the charger 1 installed in the tire housing 6, and a blower 15 for cooling the charger 1 provided in the tire housing 6, so as to lead air from the blower 15 to the fins 2; the installation structure further includes linear first and second brackets 9 and 10 disposed in parallel to each other with a distance therebetween, so as to be joined onto the upper face of the bottom 6a of the tire housing 6, wherein the charger 1 is placed on the first and second brackets 9 and 10 so as to arrange the fins 2 and the first and second brackets 9 and 10 in parallel to one another, the blower 15 is disposed in the vicinity of an aperture 14 surrounded by the first and second brackets 9 and 10 and the charger 1, and the second bracket 10 is joined together with the member 7 and the tire housing 6 to one another.

6 Claims, 6 Drawing Sheets

(56) References Cited

U.S. PATENT DOCUMENTS

| | | | |
|---|---|---|---|
| 7,017,980 B1* | 3/2006 | Bejin et al. | 296/193.07 |
| 7,051,825 B2* | 5/2006 | Masui et al. | 180/68.5 |
| 7,669,917 B2* | 3/2010 | Schiebel et al. | 296/187.01 |
| 7,688,582 B2* | 3/2010 | Fukazu et al. | 361/690 |
| 7,789,454 B2* | 9/2010 | Kim et al. | 296/184.1 |
| 7,905,307 B2* | 3/2011 | Kubota et al. | 180/68.1 |
| 7,905,541 B2* | 3/2011 | Yamaguchi et al. | 296/203.04 |
| 8,007,031 B2* | 8/2011 | Yasuhara et al. | 296/187.11 |
| 8,186,468 B2* | 5/2012 | Parrett et al. | 180/68.1 |
| 8,328,272 B2* | 12/2012 | Fujimura | 296/187.11 |
| 8,372,530 B2* | 2/2013 | Kubota et al. | 429/100 |
| 8,480,165 B2* | 7/2013 | Koyama et al. | 296/203.04 |
| 8,505,662 B2* | 8/2013 | Schwarz et al. | 180/68.5 |
| 2004/0089487 A1* | 5/2004 | Rowley et al. | 180/68.5 |
| 2004/0235315 A1* | 11/2004 | Masui et al. | 439/34 |
| 2007/0040418 A1* | 2/2007 | Ohkuma et al. | 297/15 |
| 2009/0195030 A1* | 8/2009 | Yamaguchi et al. | 296/193.08 |
| 2010/0052368 A1* | 3/2010 | Yamaguchi et al. | 296/203.04 |
| 2010/0060040 A1* | 3/2010 | Yasuhara et al. | 296/203.04 |
| 2010/0225135 A1* | 9/2010 | Taneda | 296/37.2 |
| 2010/0253188 A1* | 10/2010 | Koyama | 312/223.1 |
| 2010/0273040 A1* | 10/2010 | Kubota et al. | 429/100 |
| 2010/0294580 A1* | 11/2010 | Kubota et al. | 180/68.1 |
| 2011/0011654 A1* | 1/2011 | Kubota et al. | 180/65.21 |
| 2011/0254319 A1* | 10/2011 | Amir et al. | 296/193.08 |
| 2011/0262801 A1* | 10/2011 | Schwab | 429/163 |
| 2011/0290838 A1* | 12/2011 | Souma et al. | 224/492 |
| 2012/0091866 A1* | 4/2012 | Walker et al. | 312/7.1 |
| 2012/0175914 A1* | 7/2012 | De Luca et al. | 296/193.04 |
| 2012/0318591 A1* | 12/2012 | Lim et al. | 180/65.31 |
| 2013/0020139 A1* | 1/2013 | Kim et al. | 180/68.5 |
| 2013/0037334 A1* | 2/2013 | Hara | 180/65.1 |
| 2013/0038287 A1* | 2/2013 | Hara et al. | 320/109 |
| 2013/0134939 A1* | 5/2013 | Sato et al. | 320/109 |

FOREIGN PATENT DOCUMENTS

| | | |
|---|---|---|
| JP | 07-052834 A | 2/1995 |
| JP | 2004-345453 A | 12/2004 |
| JP | 2006-015862 A | 1/2006 |
| JP | 2008-062780 A | 3/2008 |
| JP | 2009-001185 A | 1/2009 |
| JP | 2010-173536 A | 8/2010 |

* cited by examiner

INSTALLATION STRUCTURE FOR ELECTRICAL EQUIPMENT IN REAR VEHICLE BODY

TECHNICAL FIELD

The present invention relates to an installation structure for electrical equipment in a rear vehicle body of an automobile.

BACKGROUND ART

Recently, there have been provided not only a gasoline engine automobile but also a plug-in hybrid vehicle (HEV) and an electric vehicle (EV) in consideration of the global environment. These vehicles are installed with a charger (electrical equipment) for charging a battery for supplying power to an electric motor and controlling power supplied from an external power source. Some chargers have not only relatively large in capacity and heavy in weight, but also have characteristics requiring cooling because of high temperature during the operation.

Therefore, in a vehicle installed with a charger, a storage having a special structure to secure relatively large space and enhance rigidity is provided in a lower vehicle body (for example, Patent Literature 1), or a duct is provided so as to utilize air stream for cooling the charger (for example, Patent Literature 2).

CITATION LIST

Patent Literature

Patent Literature 1: Japanese Patent Laid-Open No. 07-52834
Patent Literature 2: Japanese Patent Laid-Open No. 2006-015862

SUMMARY OF INVENTION

Technical Problem

Unfortunately, the abovementioned installation structure for a charger in the related art requires relatively large storage space in a lower vehicle body as well as rigidity should be enhanced using special components, so that flexibility in design is hindered, and a dedicated body structure should be employed, which results in increase in cost. In addition, unfortunately in a cooling system for a charger in the related art, not only is a vehicle body structure complicated, but also it is difficult to sufficiently cool an installed charger.

The present invention has been made in the light of the above facts and has an object to provide an installation structure for electrical equipment in a rear vehicle body utilizing space of an existing spare tire housing, so as to secure flexibility in design as well as storage space, enhance rigidity of an installation place without causing increase in cost, prevent vehicle body vibrations and sufficiently cool electrical equipment such as a charger.

Solution to Problem

To solve the abovementioned problems of the prior art, the present invention provides an installation structure for electrical equipment in a rear vehicle body including: a spare tire housing provided in a rear floor panel; a member extending in a longitudinal direction of a vehicle and provided on a lower face of a bottom of the spare tire housing; electrical equipment provided with fins for cooling under the electrical equipment, the electrical equipment installed in the spare tire housing; and a blower for cooling the electrical equipment provided in the spare tire housing so as to lead air from the blower to the fins for cooling at the electrical equipment; the installation structure further including a linear first bracket and a linear second bracket disposed in parallel to each other with a distance therebetween, so as to be joined onto an upper face of the bottom of the spare tire housing, wherein the electrical equipment is placed on the first bracket and the second bracket so as to arrange the fins for cooling, the first bracket and the second bracket in parallel to one another, the blower is disposed in a vicinity of one of front and rear apertures surrounded by the first bracket, the second bracket and the electrical equipment, and at least one of the first bracket and the second bracket is joined together with the member and the spare tire housing to one another.

In the present invention, the first bracket and the second bracket are disposed in parallel to the member, and at least one of the first bracket and the second bracket is disposed so as to be overlapped with the member.

In addition in the present invention, each of the first bracket, the second bracket and the member is formed to have a hat-shaped cross section with flanges on right and left sides thereof, either flange or both flanges on the right and left sides of at least one of the first bracket and the second bracket are disposed so as to be overlapped with either flange or both flanges on the right and left sides of the member, and the overlapped flanges are joined together with the spare tire housing in three layers to one another.

Further, in the present invention, the first bracket and the second bracket are disposed in a direction vertical to the member, and the first bracket and the second bracket are disposed so as to be partially overlapped with the member.

In the present invention, each of the first bracket, the second bracket and the member is formed to have a hat-shaped cross section with flanges on right and left sides thereof, and at a position where the respective flanges of the first bracket and the second bracket are overlapped with the flanges of the member, the overlapped flanges are joined together with the spare tire housing in three layers to one another.

The present invention also provides an installation structure for electrical equipment in a rear vehicle body including: a spare tire housing provided in a rear floor panel; a member extending in a longitudinal direction of a vehicle and provided on a lower face of a bottom of the spare tire housing; electrical equipment provided with fins for cooling under the electrical equipment, the electrical equipment installed in the spare tire housing; and a blower for cooling the electrical equipment provided in the spare tire housing so as to lead air from the blower to the fins for cooling at the electrical equipment; the installation structure further including a linear first bead and a linear second bead formed to project upward on an upper face of the bottom of the spare tire housing, and the first bead and the second bead are provided in parallel to each other with a distance therebetween, wherein the electrical equipment is placed on the first bead and the second bead so as to arrange the fins for cooling, the first bead and the second bead in parallel to one another, the blower is disposed in a vicinity of one of front and rear apertures surrounded by the first bead, the second bead and the electrical equipment, and at least one of the first bead and the second bead is disposed so as to be overlapped with the member.

Advantageous Effects of Invention

As described above, the installation structure for electrical equipment in a rear vehicle body according to the present invention includes: a spare tire housing provided in a rear floor panel; a member extending in a longitudinal direction of a vehicle and provided on a lower face of a bottom of the spare tire housing; electrical equipment provided with fins for cooling under the electrical equipment, the electrical equipment installed in the spare tire housing; and a blower for cooling the electrical equipment provided in the spare tire housing so as to lead air from the blower to the fins for cooling at the electrical equipment, the installation structure further includes a linear first bracket and a linear second bracket disposed in parallel to each other with a distance therebetween, so as to be joined onto an upper face of the bottom of the spare tire housing, the electrical equipment is placed on the first bracket and the second bracket so as to arrange the fins for cooling, the first bracket and the second bracket in parallel to one another, the blower is disposed in a vicinity of one of front and rear apertures surrounded by the first bracket, the second bracket and the electrical equipment, and at least one of the first bracket and the second bracket is joined together with the member and the spare tire housing to one another, so that the following effects can be attained.

According to the installation structure of the present invention, it is possible to enhance the face rigidity by reinforcing the bottom of the spare tire housing using the first bracket and the second bracket while securing flexibility in design and storage space, and it is also possible to prevent vibrations from being transferred to the installed electrical equipment and also prevent distortion and deformation of the equipment body, as well as reduce problems caused in the case of utilizing a spare tire housing. In addition, according to the installation structure of the present invention, the first bracket and the second bracket function as walls of passages of the cooling air led to the electrical equipment, so that it is unnecessary to form the walls using other components, thereby reducing the number of components and attaining cost reduction.

In the present invention, the first bracket and the second bracket are disposed in parallel to the member, and at least one of the first bracket and the second bracket is disposed so as to be overlapped with the member; therefore, it is possible to enhance rigidity of the vehicle body in the longitudinal direction of the vehicle, and also possible to suppress the damages of the electrical equipment by preventing the back panel from coming in contact with the electrical equipment when the back panel moves frontward of the vehicle even if the spare tire housing or the back panel is deformed by load applied from the rear of the vehicle.

In the present invention, each of the first bracket, the second bracket and the member is formed to have a hat-shaped cross section with flanges on right and left sides thereof, either flange or both flanges on the right and left sides of at least one of the first bracket and the second bracket are disposed so as to be overlapped with either flange or both flanges on the right and left sides of the member, and the overlapped flanges are joined together with the spare tire housing in three layers to one another; therefore it is possible to attain improved rigidity of the vehicle body in the longitudinal direction of the vehicle.

Further in the present invention, the first bracket and the second bracket are disposed in a direction vertical to the member, and the first bracket and the second bracket are disposed so as to be partially overlapped with the member; therefore, the two brackets and the member form a grid shape in the plane view, thereby enhancing rigidity of the bottom of the spare tire housing both in the longitudinal direction and in the width direction (right and left direction) of the vehicle. In addition, such layout is effective in any vibration mode, and effectively works as an overall solution of preventing vibrations from being transferred to the electrical equipment.

In the present invention, each of the first bracket, the second bracket and the member is formed to have a hat-shaped cross section with flanges on right and left sides thereof, and at a position where the respective flanges of the first bracket and the second bracket are overlapped with the flanges of the member, the overlapped flanges are joined together with the spare tire housing in three layers to one another; therefore, it is possible to further enhance rigidity of the bottom of the spare tire housing in the longitudinal and the width directions of the vehicle.

The installation structure for electrical equipment in a rear vehicle body according to the present invention includes: a spare tire housing provided in a rear floor panel; a member extending in a longitudinal direction of a vehicle and provided on a lower face of a bottom of the spare tire housing; electrical equipment provided with fins for cooling under the electrical equipment, the electrical equipment installed in the spare tire housing; and a blower for cooling the electrical equipment so provided in the spare tire housing as to lead air from the blower to the fins for cooling at the electrical equipment, and the installation structure further includes a linear first bead and a linear second bead formed to project upward on an upper face of the bottom of the spare tire housing, and the first bead and the second bead are provided in parallel to each other with a distance therebetween, the electrical equipment is placed on the first bead and the second bead so as to arrange the fins for cooling, the first bead and the second bead in parallel to one another, the blower is disposed in a vicinity of one of front and rear apertures surrounded by the first bead, the second bead and the electrical equipment, and at least one of the first bead and the second bead is disposed so as to be overlapped with the member; therefore, it is possible to attain the same effects as those in the above described invention, as well as realize further reduction of components cost by reducing the number of the components.

DESCRIPTION OF EMBODIMENTS

Detailed description will be provided on the present invention based on the illustrated embodiments.

FIG. 1 to FIG. 7 illustrate the installation structure for electrical equipment in a rear vehicle body according to an embodiment of the present invention.

Figure 1:
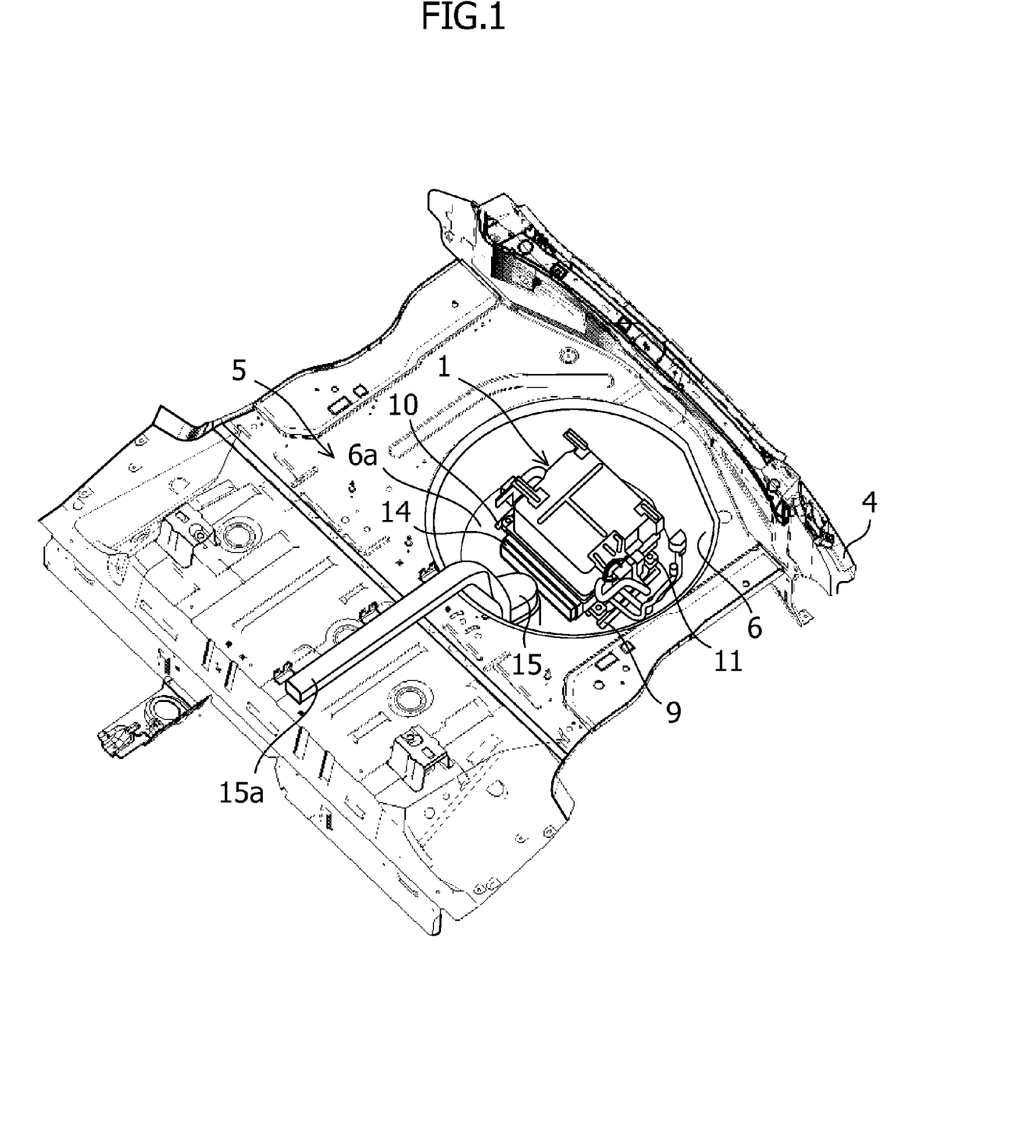
FIG. 1 is a perspective view of illustrating that a charger is placed on a first bracket and a second bracket joined onto an upper face of a bottom of a spare tire housing in a rear vehicle body to which an installation structure for electrical equipment according to an embodiment of the present invention is applied.
Figure 6:
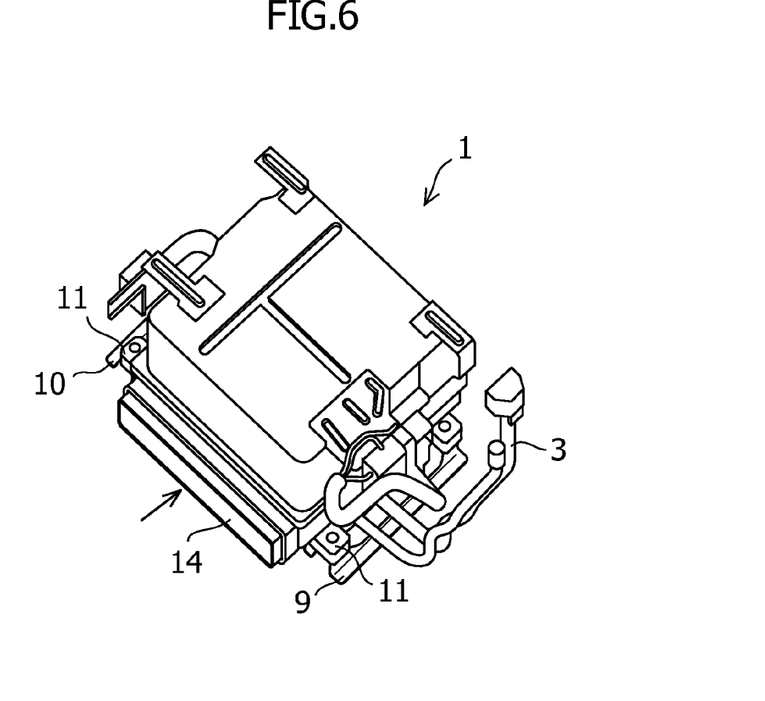
FIG. 6 is a perspective view of illustrating that air is sent from a blower to fins for cooling at the charger in FIG. 1.
Figure 7:
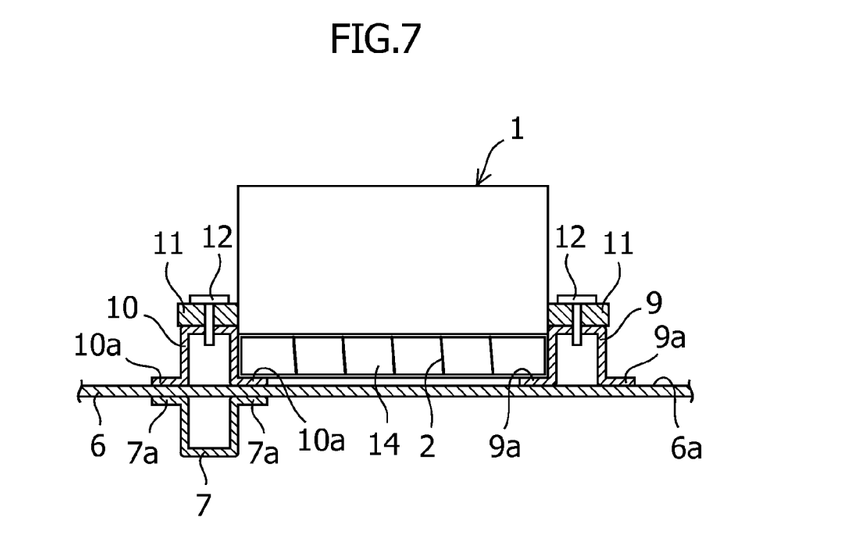
FIG. 7 is a front view of schematically illustrating the charger in FIG. 1.

An automobile to which the installation structure according to the embodiment of the present invention is applied is a plug-in hybrid vehicle or an electric vehicle, and includes a charger 1 for battery charge for supplying power to an electric motor and controlling power supplied from an external power source, as one of installed electrical equipment in the rear vehicle body as illustrated in FIG. 1, FIG. 6, and FIG. 7.

This charger 1 is electrical equipment requiring air cooling, and plural fins 2 for cooling are provided under the equipment body so as to project downward with a constant interval therebetween in the width direction, and air is sent to the plural fins 2 from a blower described later, so as to cool the entire charger 1. The charger 1 includes an outlet cable 3, and this outlet cable 3 extends rearward of the vehicle, and is connected to a charging connector module (not shown) provided at a rear bumper member 4.

Figure 2:
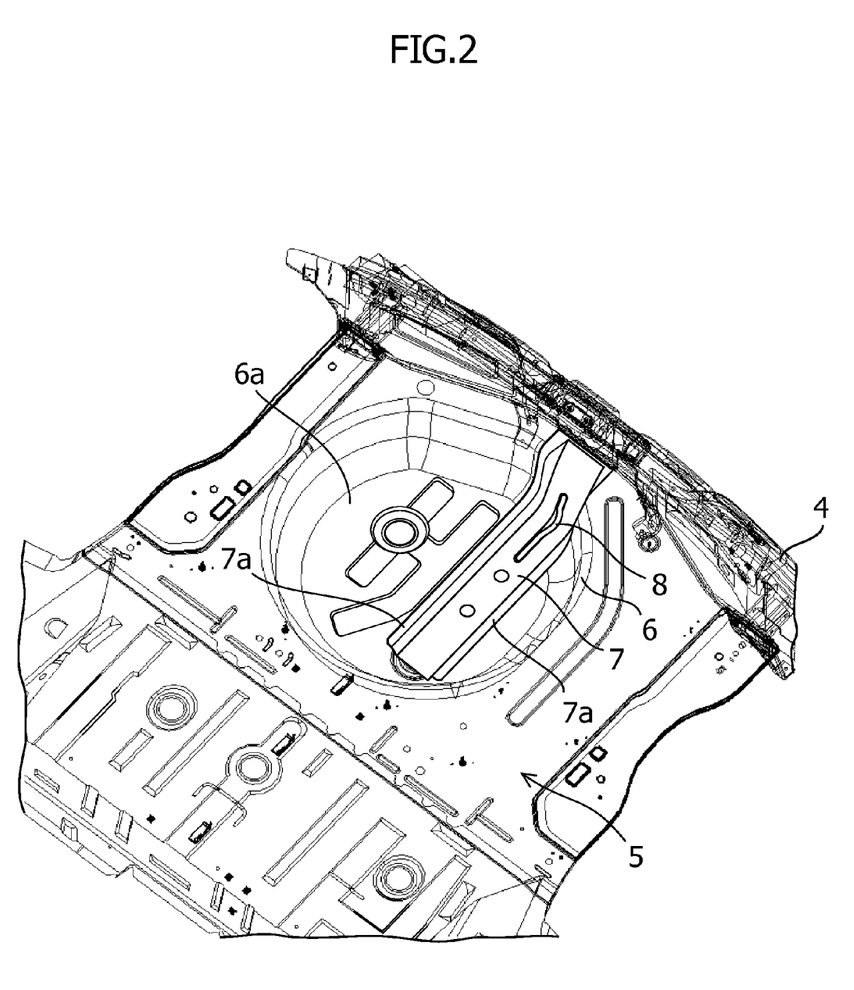
FIG. 2 is a perspective view of the spare tire housing provided with a hook member when viewed from the bottom of the spare tire housing.

The charger 1 of the present embodiment is configured to be installed by utilizing space in an existing spare tire housing 6 provided at a rear floor panel 5 in the rear vehicle body. This spare tire housing 6 has a size and a shape large enough to house a spare tire laid horizontally, and has a downwardly recessed housing portion, and a bottom 6a thereof is formed in a substantially flat surface. On the lower face of the bottom 6a of the spare tire housing 6, as illustrated in FIG. 2 and FIG. 7, a hook member 7 is provided which extends from the vicinity of the front portion of the spare tire housing 6 beyond the rear portion of the spare tire housing 6 to the vicinity of the rear bumper member 4 in the longitudinal direction of the vehicle.

This hook member 7 is formed to have a hat-shaped cross section with flanges 7a on right and left sides thereof, and these flanges 7a are overlapped with and joined onto the lower face of the bottom 6a of the spare tire housing 6 by welding. A tow hook 8 is attached to the vehicle-rearward corner of the bottom face of the hook member 7.

In the middle of the upper face of the bottom 6a of the spare tire housing 6 according to the present embodiment, a linear first bracket (or bead) 9 and a linear second bracket (or bead) 10 are disposed in parallel to each other with a certain distance therebetween in the vehicle width (right and left) direction, as illustrated in FIG. 1 and FIG. 3 to FIG. 7, and the first bracket 9 and the second bracket 10 extend in the longitudinal direction of the vehicle.

Figure 3:
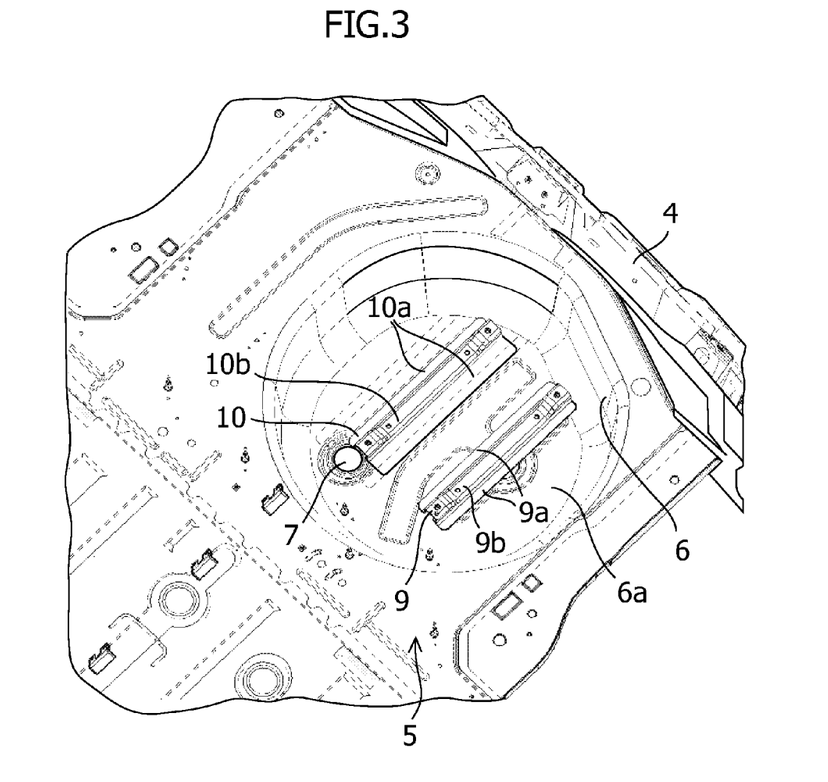
FIG. 3 is a perspective view of illustrating that the first bracket and the second bracket are joined onto the upper face of the bottom of the spare tire housing in a rear vehicle body to which the installation structure for electrical equipment according to the embodiment of the present invention is applied.
Figure 4:
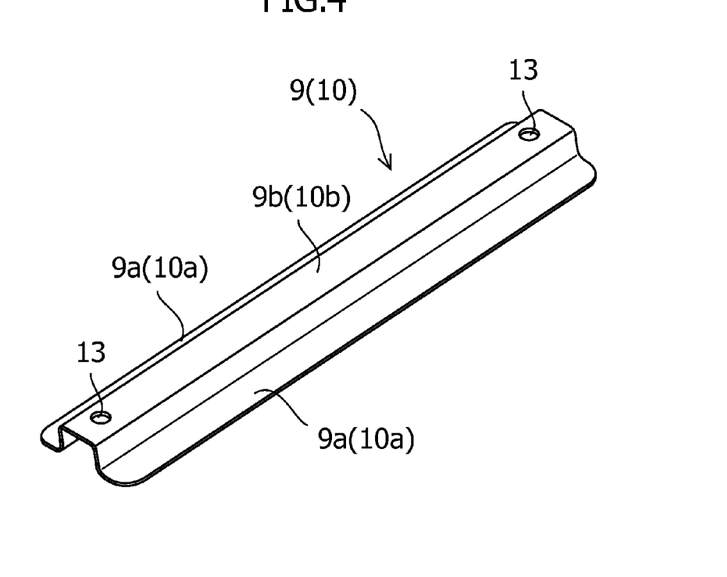
FIG. 4 is an enlarged perspective view of illustrating the first bracket and the second bracket in FIG. 3.
Figure 5:
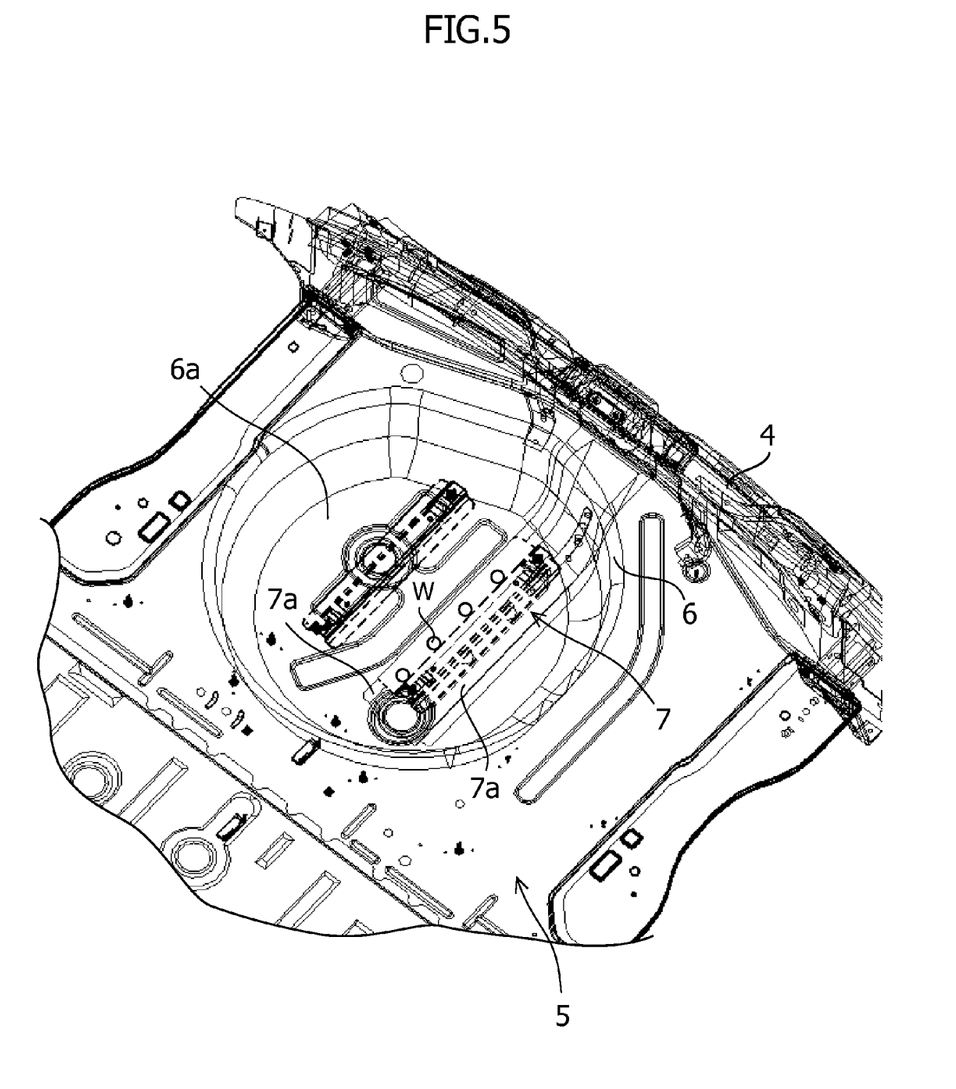
FIG. 5 is a perspective view of illustrating that flanges of the second bracket provided to the upper face of the bottom of the spare tire housing and flanges of the hook member provided to the lower face of the bottom of the spare tire housing are joined together in three layers to one another in FIG. 2.

The first bracket 9 and the second bracket 10 are formed to have a hat-shaped cross section with flanges 9a and flanges 10a on the right and left sides thereof, respectively, and these flanges 9a and 10a are overlapped with and joined onto the upper face of the bottom 6a of the spare tire housing 6 by welding. In addition, the first bracket 9 and the second bracket 10 are disposed in parallel to the hook member 7, and the second bracket 10 located on the right side in the vehicle width direction is disposed so as to be overlapped with the hook member 7. Specifically, the flanges 10a on the right and left sides of the second bracket 10 are disposed so as to be overlapped with the flanges 7a on the right and left sides of the hook member 7, and these overlapped flanges 10a and 7a are joined together with the bottom 6a of the spare tire housing 6 in three layers to one another by welding plural points of the position W.

The charger 1 is configured to be placed on upper faces 9b and 10b of the first bracket 9 and the second bracket 10 through attachment pieces 11 provided in the four quarters. Therefore, bolt holes 13 are pierced at the front and the rear positions of the upper faces 9b and 10b of the first bracket 9 and the second bracket 10 so that clamping bolts 12 are screwed into the bolt holes 13, the respective attachment pieces 11 are placed onto the upper faces 9b and 10b of the brackets 9 and 10 so as to position the bolt holes (not illustrated) of the attachment pieces 11 to the bolt holes 13 of the brackets 9 and 10, and in this state, the clamping bolts 12 are screwed and clamped into the respective bolt holes, thereby fixing the charger 1 onto the upper faces 9b and 10b of the first bracket 9 and the second bracket 10.

In the state in which the charger 1 is placed on the upper faces 9b and 10b of the first bracket 9 and the second bracket 10, the fins 2 for cooling at the charger 1, and the first bracket 9 and the second bracket 10 are arranged in parallel to one another. Apertures 14 are formed at each of the front and rear positions of the vehicle, which are surrounded by the first bracket 9 and the second bracket 10 and the charger 1, and a blower 15 is disposed in the vicinity of one of the two apertures 14 located frontward of the vehicle.

The blower 15 is provided at the front portion in the spare tire housing 6 so as to cool the charger 1, and includes a flow duct 15a extending toward the spare tire housing 6 in the longitudinal direction of the vehicle. Specifically, the blower 15 is configured to take in air from the duct 15a and blow out the air toward the apertures 14 as indicated by the arrow of FIG. 6, so that the air is led to the fins 2 for cooling, thereby cooling the charger 1 through the fins 2. At this time, the first bracket 9 and the second bracket 10 that support the charger 1 function as the right and left walls at the position where the cooling air flows, and encourage the air having flowed through the fins 2 for cooling to equally flow rearward of the vehicle.

As described above, in the installation structure for electrical equipment in a rear vehicle body according to the embodiment of the present invention, the hook member 7, which extends in the longitudinal direction and has a hat-shaped cross section with the flanges 7a on the right and left sides thereof, is provided onto the lower face of the bottom 6a of the spare tire housing 6, and the first bracket 9 and the second bracket 10, which are liner and have a hat-shaped cross section with the flanges 9a, 10a on the right and left sides thereof, are provided onto the upper face of the bottom 6a of the spare tire housing 6 with a certain distance therebetween. The flanges 10a on the right and left sides of the second bracket 10 and the flanges 7a on the right and left sides of the hook member 7 are joined in three layers to each other via the spare tire housing 6 therebetween, thereby enhancing the face rigidity by reinforcing the bottom 6a of the spare tire housing 6. According to the installation structure of the present embodiment, the charger 1 having a large capacity and being heavy in weight weight is clamped with the bolts onto the upper faces 9b and 10b of the first bracket 9 and the second bracket 10 through the attachment pieces 11, thereby suppressing vibrations generated during the vehicle driving operation to be transferred to the charger 1 even if the charger 1 is installed in the spare tire housing 6. In addition, it is possible to prevent the charger 1 from deforming and becoming damaged even if the spare tire hose 6 is deformed by load applied from the rear of the vehicle so that the spare tire hose 6 moves frontward of the vehicle. Such a configuration reduces problems caused by placing the charger 1 having heavy weight by utilizing space in the spare tire housing 6 whose bottom 6a is a flat surface with insufficient rigidity. For example, it is possible to reduce the following problems: (1) vibrations are transferred to the charger 1 from the bottom 6a of the spare tire housing 6 in the vibration deformation mode during the vehicle driving operation; (2) inertial force of the charger 1 in the vertical direction deforms the bottom 6a of the spare tire housing 6 due to vertical oscillations during the vehicle driving operation; (3) the spare tire housing 6 is deformed due to load applied from the rear of the vehicle so that the wall portion or the like of the spare tire housing 6 comes in contact with the charger 1; and (4) the spare tire housing 6 is significantly deformed due to load applied from the rear of the vehicle, so that large load is applied to the charger 1. These problems can be prevented by using a spare tire having relatively light unit weight and preventing harmful effects of transferred vibrations.

In the installation structure of the present embodiment, the charger 1 is placed on the upper faces 9b and 10b of the first bracket 9 and the second bracket 10, and the blower 15 is disposed in the vicinity of the aperture 14 surrounded by the charger 1, the first bracket 9 and the second bracket 10; accordingly it is possible to efficiently lead the air blown out of the blower 15 downward to the fins 2 for cooling, so as to effectively cool the charger 1 without using a special component.

Figure 8:
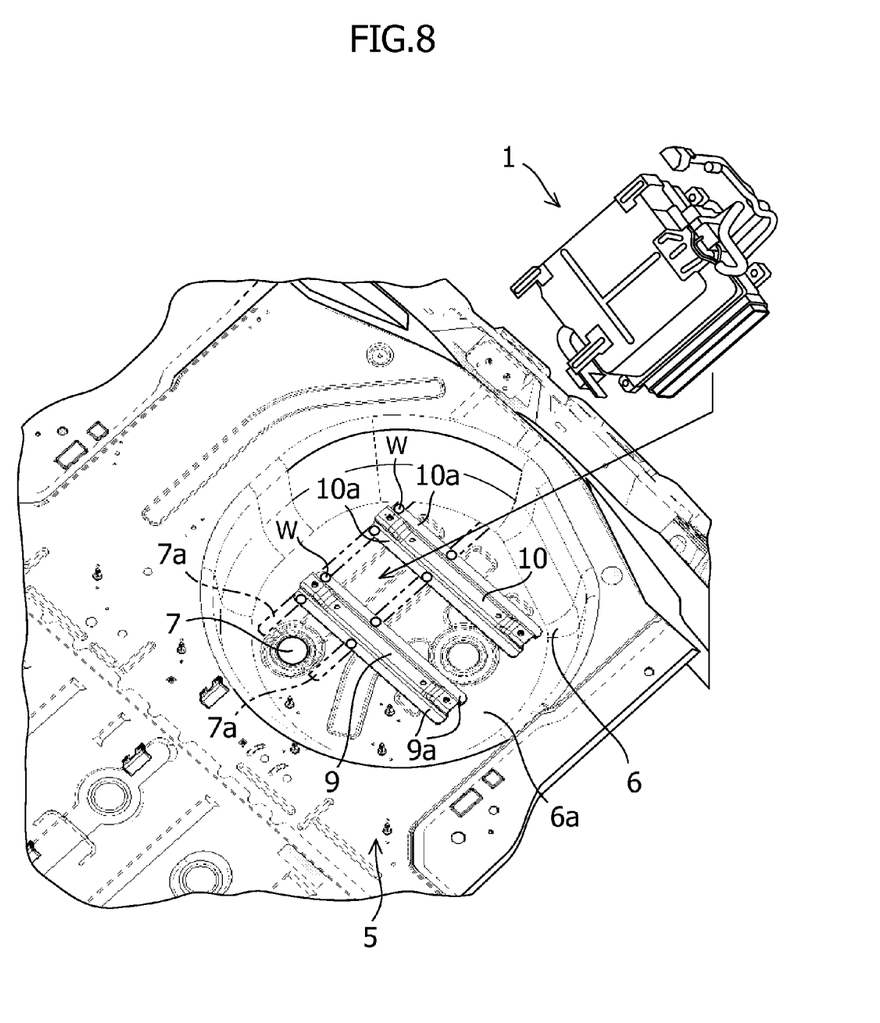
FIG. 8 is a perspective view of illustrating that the first bracket and the second bracket are joined onto the upper face of the bottom of the spare tire housing in a rear vehicle body to which the installation structure for electrical equipment according to another embodiment of the present invention is applied.

FIG. 8 illustrates the rear vehicle body to which the installation structure for electrical equipment according to another embodiment of the present invention is applied. In the installation structure of the present embodiment, as illustrated in FIG. 8, the first bracket 9 and the second bracket 10 are disposed in the vehicle width direction vertical to the hook member 7, and the first bracket 9 and the second bracket 10 are disposed so as to be partially overlapped with the hook member 7. At the position W where the flanges 9a and 10a of the first bracket 9 and the second bracket 10 are overlapped with the flanges 7a of the hook member 7, the first bracket 9 and the second bracket 10 are joined together with the bottom 6a of the spare tire housing 6 to one another in three layers by welding. The blower 15 or other components are disposed so as to be opposite to the fins 2 for cooling in accordance with the installation direction of the charger 1 in the case of replacing the charger 1. Other configurations are the same as the above embodiment, and the same components are designated by the same reference numbers, and description thereof will be omitted.

In the installation structure for electrical equipment in a rear vehicle body according to another embodiment of the present invention, the first bracket 9 and the second bracket 10 are disposed in the direction vertical to the hook member 7, and the first bracket 9 and the second bracket 10 are disposed so as to be partially overlapped with the hook member 7, and at the position where the flanges 9a and 10a of the first bracket 9 and the second bracket 10 are overlapped with the flanges 7a of the hook member 7, the first bracket 9 and the second bracket 10 are joined together with the bottom 6a of the spare tire housing 6 to one another in three layers, so as to be in a grid shape in the plane view, thereby enhancing rigidity of the bottom 6a of the spare tire housing 6 through the entire region in the longitudinal and width directions of the vehicle. The other operational effects are the same as those in the above described embodiment.

Although the embodiments of the present invention has been described above, the present invention is not limited to the above-described embodiments, and various change and modifications may be applicable based on the technical concept of the present invention.

For example, in the above-described embodiments, the flanges 10a on the right and left sides of the second bracket 10 and the flanges 7a on the right and left sides of the hook member 7 are overlapped with and joined to each other, but the flanges 9a on the right and left sides of the first bracket 9 and the flanges 7a on the right and left sides of the hook member 7 may be overlapped with and joined to each other. Either flange 9a on the right and left sides of the first bracket 9 or the second bracket 10 and either flange 7a on the right and left sides of the hook member 7 may be overlapped with and joined to each other.

Instead of the first bracket 9 and the second bracket 10 in the above-described embodiments, the linear first bead 9 and the linear second bead 10 so formed integrally as to project upward on the upper face of the bottom 6a of the spare tire housing 6 may be used, and at least one of the first bead 9 and the second bead 10 may be so disposed as to be overlapped with the hook member 7. Such an installation structure can reduce the number of components as well as component cost.

The invention claimed is:

1. An installation structure for electrical equipment in a rear vehicle body, comprising:
    a spare tire housing provided in a rear floor panel;
    a member extending in a longitudinal direction of a vehicle and provided on a lower face of a bottom of the spare tire housing;
    electrical equipment provided with fins for cooling under the electrical equipment, the electrical equipment installed in the spare tire housing; and
    a blower for cooling the electrical equipment provided in the spare tire housing and configured so as to lead air from the blower to the fins for cooling at the electrical equipment,
    the installation structure further comprising a linear first bracket and a linear second bracket disposed in parallel to each other with a distance therebetween, so as to be joined onto an upper face of the bottom of the spare tire housing, wherein
    the electrical equipment is placed on the first bracket and the second bracket so as to arrange the fins for cooling, the first bracket and the second bracket in parallel to one another,
    the blower is disposed in a vicinity of one of front and rear apertures surrounded by the first bracket, the second bracket and the electrical equipment, and
    at least one of the first bracket and the second bracket is joined together with the member and the spare tire housing to one another.

2. The installation structure for electrical equipment in a rear vehicle body according to claim 1, wherein
    the first bracket and the second bracket are disposed in parallel to the member, and
    at least one of the first bracket and the second bracket is disposed so as to be overlapped with the member.

3. The installation structure for electrical equipment in a rear vehicle body according to claim 2, wherein
    each of the first bracket, the second bracket and the member is formed to have a hat-shaped cross section with flanges on right and left sides thereof,
    either flange or both flanges on the right and left sides of at least one of the first bracket and the second bracket are disposed so as to be overlapped with either flange or both flanges on the right and left sides of the member, and
    the overlapped flanges are joined together with the spare tire housing in three layers to one another.

4. The installation structure for electrical equipment in a rear vehicle body according to claim 1, wherein the first bracket and the second bracket are disposed in a direction vertical to the member, and the first bracket and the second bracket are disposed so as to be partially overlapped with the member.

5. The installation structure for electrical equipment in a rear vehicle body according to claim 4, wherein each of the first bracket, the second bracket and the member is formed to have a hat-shaped cross section with flanges on right and left sides thereof, and at a position where the respective flanges of the first bracket and the second bracket are overlapped with the flanges of the member, the overlapped flanges are joined together with the spare tire housing in three layers to one another.

6. An installation structure for electrical equipment in a rear vehicle body comprising:

a spare tire housing provided in a rear floor panel;

a member extending in a longitudinal direction of a vehicle and provided on a lower face of a bottom of the spare tire housing;

electrical equipment provided with fins for cooling under the electrical equipment, the electrical equipment installed in the spare tire housing; and a blower for cooling the electrical equipment provided in the spare tire housing and configured so as to lead air from the blower to the fins for cooling at the electrical equipment, the installation structure further comprising a linear first bead and a linear second bead formed to project upward on an upper face of the bottom of the spare tire housing, and the first bead and the second bead provided in parallel to each other with a distance therebetween, wherein the electrical equipment is placed on the first bead and the second bead so as to arrange the fins for cooling, the first bead and the second bead in parallel to one another, the blower is disposed in a vicinity of one of front and rear apertures surrounded by the first bead, the second bead and the electrical equipment, and at least one of the first bead and the second bead is disposed so as to be overlapped with the member.

* * * * *